(12) United States Patent
Greber

(10) Patent No.: US 10,605,145 B2
(45) Date of Patent: Mar. 31, 2020

(54) ASSEMBLY WITH A VALVE HAVING A COOLED DRIVING SHAFT FOR AN EXHAUST LINE

(71) Applicant: Faurecia Systemes D'Echappement, Nanterre (FR)

(72) Inventor: Frederic Greber, Ecot (FR)

(73) Assignee: Faurecia Systemes D'Echappement (FR)

( * ) Notice: Subject to any disclaimer, the term of this patent is extended or adjusted under 35 U.S.C. 154(b) by 0 days.

(21) Appl. No.: 15/903,141

(22) Filed: Feb. 23, 2018

(65) Prior Publication Data

US 2019/0120111 A1     Apr. 25, 2019

Related U.S. Application Data

(60) Provisional application No. 62/463,798, filed on Feb. 27, 2017.

(30) Foreign Application Priority Data

Feb. 27, 2017    (FR) ...................................... 17 51588

(51) Int. Cl.
    *F01N 5/02*          (2006.01)
    *F16K 49/00*        (2006.01)

(52) U.S. Cl.
    CPC .............. *F01N 5/02* (2013.01); *F16K 49/005* (2013.01); *F01N 2240/02* (2013.01); *F01N 2240/20* (2013.01); *F01N 2240/36* (2013.01); *F01N 2260/20* (2013.01); *F01N 2410/00* (2013.01); *Y02T 10/16* (2013.01)

(58) Field of Classification Search
    CPC .... F01N 5/02; F01N 2240/02; F01N 2240/20; F01N 2240/36; F01N 2260/20; F01N 2410/00; F16K 49/005; Y02T 10/16
    See application file for complete search history.

(56) References Cited

U.S. PATENT DOCUMENTS

2010/0146954 A1*    6/2010    Sloss ..................... F01N 3/2889
                                                                             60/320
2011/0302910 A1     12/2011    Burgers et al.

FOREIGN PATENT DOCUMENTS

EP               2378092 A2     10/2011

OTHER PUBLICATIONS

Search Report for FR 1751588 dated Jul. 17, 2017.

* cited by examiner

*Primary Examiner* — Brandon D Lee
(74) *Attorney, Agent, or Firm* — Carlson, Gaskey & Olds, P.C.

(57) ABSTRACT

An assembly includes a heat exchanger, a bypass conduit defining a path for passage for the exhaust gases and bypassing the heat exchanger, and a valve adjusting the amounts of exhaust gases circulating through the heat exchanger and through the bypass conduit respectively. The valve has a driving shaft, and the assembly further comprises a fluid box that is in fluid communication with a heat transfer fluid circulation side of the heat exchanger and arranged around the driving shaft to cool the driving shaft.

15 Claims, 8 Drawing Sheets

ASSEMBLY WITH A VALVE HAVING A COOLED DRIVING SHAFT FOR AN EXHAUST LINE

CROSS-REFERENCE TO RELATED APPLICATIONS

This application claims priority to FR 17 51588, filed Feb. 27, 2017, and also claims priority to U.S. Provisional Patent Application No. 62/463,798, filed Feb. 27, 2017.

FIELD OF THE INVENTION

The invention generally relates to exhaust systems equipped with an energy recovery system.

More specifically, the invention relates in a first aspect to an exhaust line assembly that includes a heat exchanger with an exhaust gas circulation side having an exchanger inlet connected to the exhaust gas inlet, and an exchanger outlet connected to the exhaust gas outlet. The heat exchanger further has a heat transfer fluid circulation side with a heat transfer fluid inlet and a heat transfer fluid outlet. A bypass conduit defines a path for passage of the exhaust gases from the exhaust gas inlet to the exhaust gas outlet and bypasses the heat exchanger. A valve adjusts amounts of exhaust gases circulating through the heat exchanger and through the bypass conduit respectively. The valve has a valve body traversed internally by the exhaust gases a flap arranged inside the valve body that is movable relative to the valve body, and a shaft for driving the flap.

BACKGROUND

An exhaust line assembly is known, for example, from FR 2 966 873. In such an assembly, a driving shaft is heated to high temperature by the exhaust gases flowing in a bypass conduit. For a gas temperature of 850° C., the temperature of the driving shaft reaches 550 to 600° C. at an end of the shaft which is connected to an actuator. A guiding bearing of the shaft, the actuator and a kinematic chain coupling the actuator to the driving shaft must therefore withstand extremely high temperatures.

This has the consequence that the materials used for the bearing and the elements of the kinematic chain have to be chosen for their temperature resistance, but have other defects. It is particularly difficult to eliminate the noise produced during the rotation of the flap. In addition, significant clearances are created at high temperature because of the expansion of the shaft relative to the bearing. There is also gas leakage along the shaft to the outside of the exhaust line.

It is common to use an electric motor to drive the flap. Such actuators typically include a plastic housing, as well as plastic gears. Thus, the motor and its electronics do not support temperatures above 120 or 140° C., depending on the case.

As a result, it is generally necessary to move the output shaft of the actuator away from the driving shaft in order to limit direct thermal conduction. It is also common to add heat shields between the actuator and the valve.

Moreover, the actuator is generally attached to very hot parts of the assembly using tabs. These tabs conduct heat to the actuator. To remedy this problem, it is possible to move the actuator further away. However, this makes the whole assembly less compact and sensitive to vibration.

In this context, the invention aims to propose an assembly in which the problems mentioned above are suppressed or attenuated.

SUMMARY

An exhaust line assembly includes a fluid box that communicates fluidically with a heat transfer fluid circulation side of a heat exchanger and which is arranged around a driving shaft of a valve to cool the driving shaft.

Thus, in the invention, the heat transfer fluid circulating in the heat exchanger is used to cool the driving shaft. This heat transfer fluid may be easily led towards the fluid box, since the valve is arranged very close to the heat exchanger.

The maximum temperature of the heat transfer fluid is of the order of 120° C. It is therefore significantly lower than the temperature of the driving shaft and may cool it very effectively. This keeps the actuator at a suitable temperature. This also makes it possible to maintain a kinematic chain and guiding bearing of the driving shaft at temperatures much lower than temperatures known in the prior art. As a result, it is possible to use less expensive or more efficient materials, in particular materials that are more leakproof for the exhaust gas in order to limit leakage to the outside. This also reduces friction between the driving shaft and the bearing, and also makes the bearing more durable.

The kinematic chain connecting the actuator to the driving shaft may be simplified, and, in particular, the actuator may be moved closer to the driving shaft.

This makes the whole assembly more compact, and less sensitive to vibrations.

The assembly may also have one or more of the following characteristics, considered individually or in any technically feasible combination:

the fluid box has at least first and second orifices, wherein the first orifice is fluidically connected to one of the heat transfer fluid inlet or the heat transfer fluid outlet, while the second orifice is configured to connect to a heat recovery circuit;

the fluid box has a third orifice communicating with the other of the heat transfer fluid inlet or the heat transfer fluid outlet, and has a fourth orifice fluidically communicating with the third orifice through the fluid box, wherein the fourth orifice is configured to connect to the heat recovery circuit;

the valve comprises at least one guiding bearing of the driving shaft arranged in the fluid box;

the fluid box internally delimits a circulation passage between the first orifice and the second orifice to form a restriction at the guiding bearing;

the fluid box comprises a lower half-shell and an upper half-shell attached sealingly to the lower half-shell, preferably in a removable manner;

the lower half-shell is rigidly fixed to the guiding bearing and to the heat exchanger;

the assembly comprises an actuator and a kinematic chain through which the actuator drives the driving shaft of the flap, wherein the actuator is fixed to the fluid box, outside the fluid box;

the driving shaft protrudes from the fluid box and the assembly has a skirt around the driving shaft sealingly connecting the actuator to the fluid box;

the actuator is an electric motor comprising an output shaft, wherein the kinematic chain comprises a reducer gear rotatably coupling the output shaft and the driving shaft;

the reducer gear is arranged in a cavity defined between the fluid box and a cover sealingly attached to the fluid box;

the cover has an opening through which the gearbox is connected to the output shaft, while the actuator is sealingly connected to the cover around the opening;

the assembly comprises an actuator and a kinematic chain through which the actuator drives the driving shaft of the flap, wherein the actuator is placed inside the fluid box;

a seal is interposed between the driving shaft and the guiding bearing;

the guiding bearing has fins in contact with the heat transfer fluid;

the driving shaft is hollow.

According to a second aspect, the invention relates to an exhaust line comprising an assembly having the characteristics above.

BRIEF DESCRIPTION OF THE DRAWING

Other features and advantages of the invention will emerge from the detailed description given below for information only and in no way limitative, with reference to the appended figures wherein.

DETAILED DESCRIPTION

Figure 1:
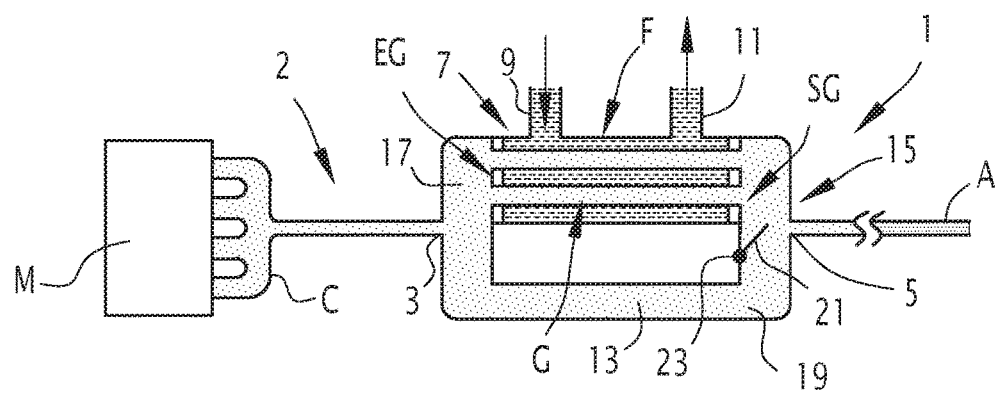
FIG. 1 shows a simplified schematic representation of an exhaust line equipped with an assembly according to the invention.

The assembly 1 is intended to be integrated in a vehicle exhaust line 2, in particular of a motor vehicle such as a car or a truck, as shown in FIG. 1.

The assembly 1 has at least one exhaust gas inlet 3 and one exhaust gas outlet 5.

The exhaust gas inlet 3 is fluidically connected to a manifold C, collecting the exhaust gas leaving combustion chambers of an engine M of the vehicle. Typically, other equipment such as one or more silencers and one or more depollution devices are interposed between the manifold C and the exhaust gas inlet 3.

The exhaust gas outlet 5 fluidically communicates with a cannula A through which the depolluted exhaust gases are released into the atmosphere. Typically, other equipment such as one or more silencers and one or more depollution devices may be interposed between the cannula A and the exhaust gas outlet 5.

Furthermore, the assembly 1 comprises a heat exchanger 7, having an exhaust gas circulation side G and a heat transfer fluid circulation side F (FIG. 1).

The exhaust gas and the heat transfer fluid are in thermal contact with each other in the heat exchanger 7, wherein the exhaust gases give up a portion of their heat energy to the heat transfer fluid.

Figure 4:
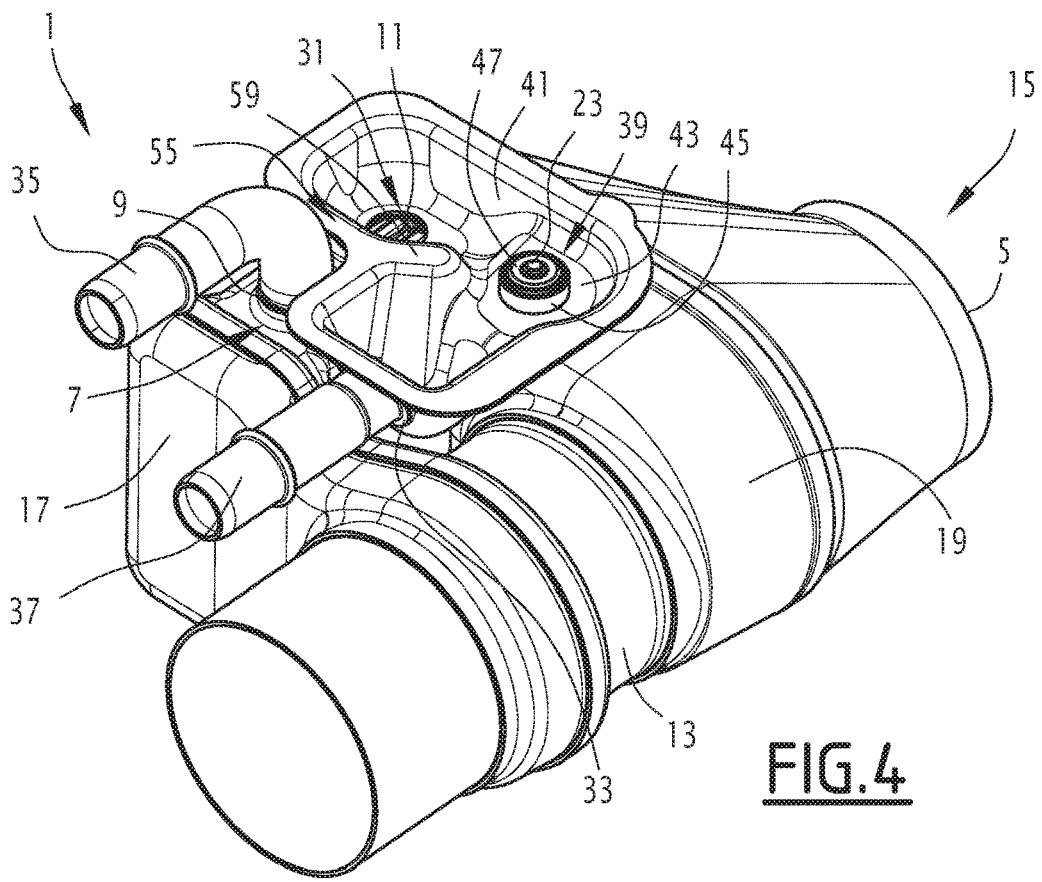
FIG. 4 shows a view similar to that of FIG. 2, wherein some elements of the assembly have been removed to reveal the lower half-shell of the fluid box.
Figure 5:
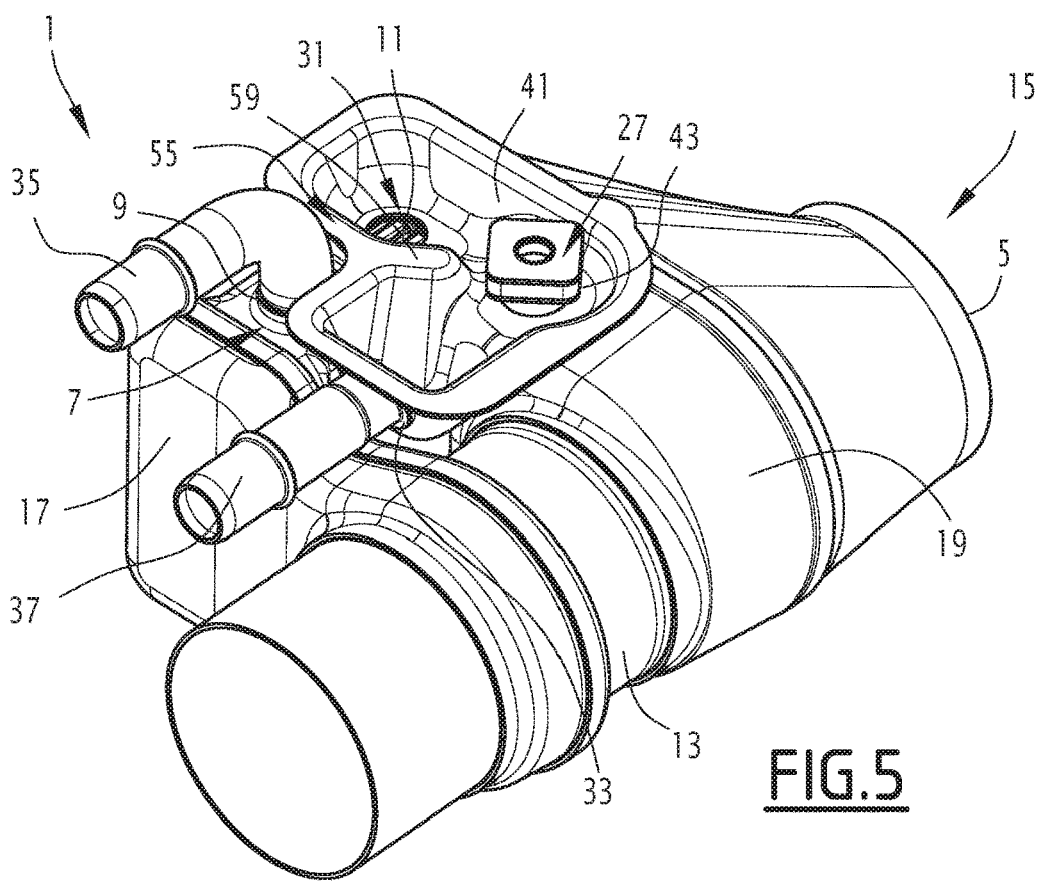
FIG. 5 shows a perspective view similar to FIG. 4, wherein a portion of the upper half-shell is shown.

The heat exchanger 7 is visible more clearly in FIGS. 4 and 5. It is of any suitable type: with tubes, with plates, etc.

The heat transfer fluid is of any suitable type. For example, the heat transfer fluid may be water, possibly containing additives such as antifreeze products, as well as antifreezes which typically comprise glycol.

The exhaust gas circulation side G has a heat exchanger inlet EG connected to the exhaust gas inlet 3 and a heat exchanger outlet SG connected to the exhaust gas outlet 5 (FIG. 1).

The heat transfer fluid circulation side F has a heat transfer fluid inlet 9 and a heat transfer fluid outlet 11 (FIGS. 1, 4 and 5). An alternative has the circulation in the opposite direction.

The assembly 1 further comprises a bypass conduit 13, defining a path for the passage of the exhaust gases from the exhaust gas inlet 3 to the exhaust gas outlet 5 and bypassing the heat exchanger 7. By this is meant that the exhaust gases passing through the bypass conduit 13 flow directly from the inlet 3 to the outlet 5 without passing through the heat exchanger 7.

The assembly 1 further comprises a valve 15 adjusting the amounts of exhaust gases flowing through the heat exchanger 7 and through the bypass conduit 13 respectively (FIGS. 1, 2, 4 and 5).

In the example shown, the valve 15 is placed at the exhaust gas outlet 5.

In this case, the assembly 1 typically comprises a cone 17 fluidically connecting the exhaust gas inlet 3 to the exchanger inlet EG and to an upstream end of the bypass conduit 13.

Furthermore, the valve 15 comprises a valve body 19 traversed internally by the exhaust gases, a flap 21 arranged inside the valve body 19 and movable relative to the valve body 19, and a shaft 23 driving the flap 21.

The valve body 19 fluidically connects the exhaust gas outlet 5 to the exchanger outlet SG and also to the downstream end of the bypass conduit 13.

Alternatively, the valve 15 may be placed at the inlet 3. In this embodiment, the positions of the cone 17 and the valve body 19 are reversed.

Figure 2:
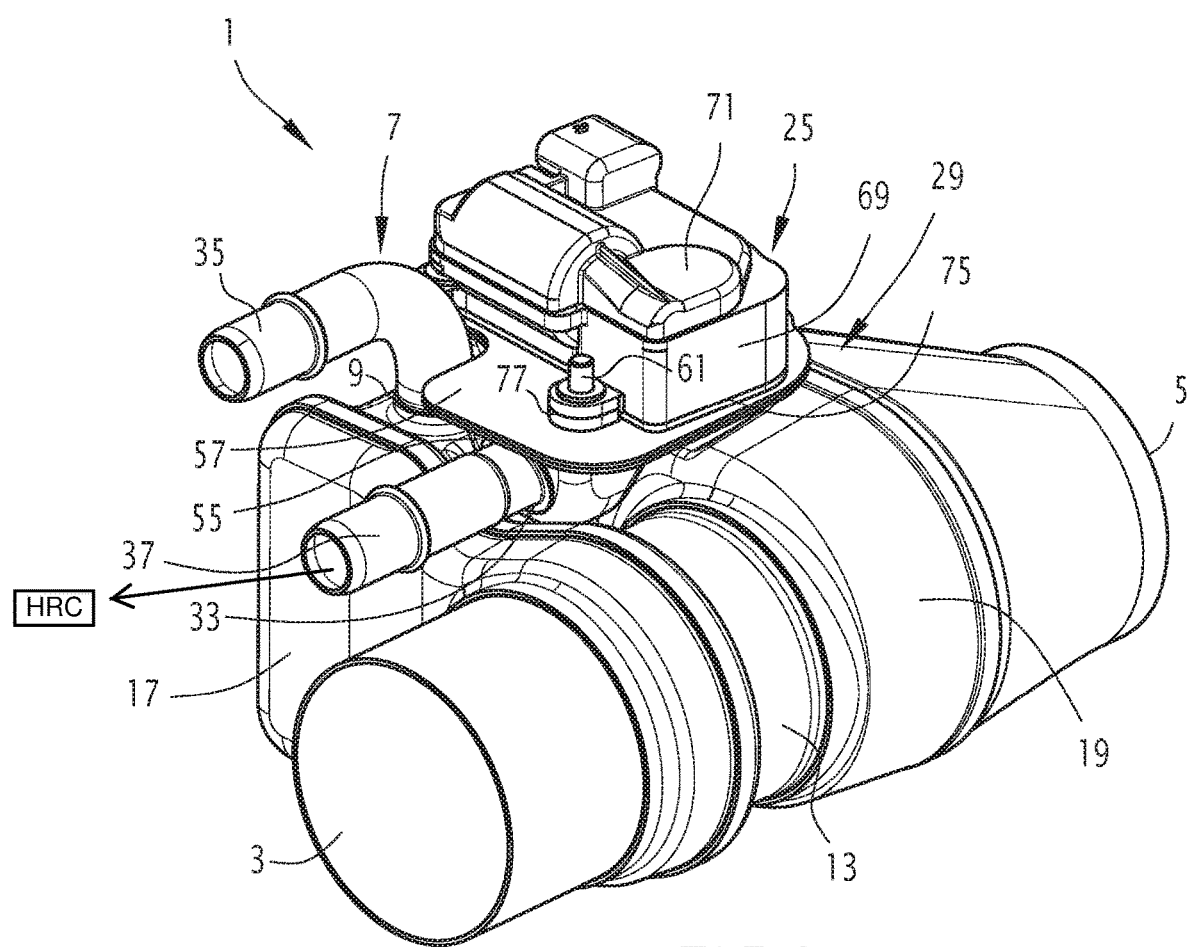
FIG. 2 shows a perspective view of an assembly according to a first embodiment of the invention.
Figure 3:
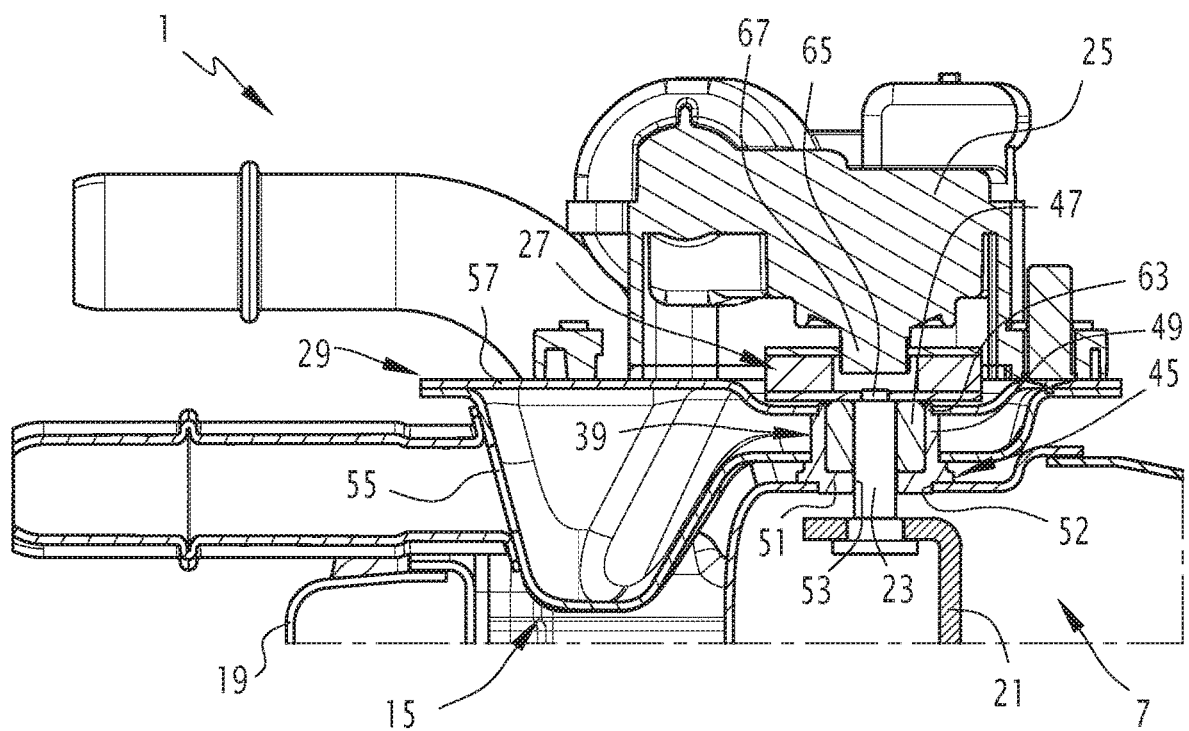
FIG. 3 shows a sectional view of the assembly of FIG. 2, taken in a plane passing through the driving shaft.

The assembly 1 also typically comprises an actuator 25 and a kinematic chain 27 through which the actuator 25 drives the driving shaft 23 (FIGS. 2 and 3).

The flap 21 typically moves rotatably with respect to the valve body 19.

The valve 15 is, for example, a regulating valve. In this case, the flap 21 may be placed at a plurality of positions relative to the valve body 19. This makes it possible to vary the cross-section of the passage provided for the exhaust gases flowing from the outlet of the exchanger SG to the exhaust gas outlet 5 respectively, and from the downstream end of the bypass conduit 13 to the exhaust gas outlet 5.

Alternatively, the valve 15 is an on-off valve. In this case, the flap 21 is capable of adopting either a heat exchange position in which the flap 21 prevents the circulation of exhaust gases in the bypass conduit 13, or a bypass position in which the flap 21 prevents the circulation of exhaust gases in the heat exchanger 7.

It should be noted that, advantageously, the driving shaft 23 is not located in the main flow of exhaust gases. It is arranged along a wall of the valve body 19 between the heat exchanger 7 and the bypass conduit 13. Similarly, the flap is of the "door" and not "butterfly" type. It is fixed by an edge on the driving shaft. In the bypass position, it is not in the main flow of exhaust gases. Thermal transfers from the exhaust gases to the driving shaft 23 are thus limited.

Advantageously, the assembly 1 comprises a fluid box 29, fluidically communicating with the heat transfer fluid circulation side F, arranged around the driving shaft 23 in order to cool the driving shaft 23 (FIGS. 2 to 5). By fluid box is meant here a hollow volume, internally defining a passage through which the heat transfer fluid passes. The driving shaft 23 is in thermal contact with the heat transfer fluid flowing through the fluid box, which allows the shaft to be cooled.

The fluid box 29 is typically attached to the valve body 19.

As may be seen, in particular, in FIG. 5, the fluid box 29 has first and second openings 31, 33.

In a first embodiment variant, the first orifice 31 is fluidically connected to the heat transfer fluid outlet 11. In this case, the second orifice 33 is intended to be connected to a heat recovery circuit HRC (FIG. 2). The assembly 1 then typically comprises an inlet conduit 35 fixed to the heat exchanger and communicating with the heat transfer fluid inlet 9 (FIG. 2). It also comprises an outlet conduit 37 fixed to the orifice 33 (FIG. 2).

The heat recovery circuit is provided to recover a portion of the heat energy of the exhaust gases and transfer it to another circuit or another member of the vehicle body. For example, it may transfer this heat energy to the heating circuit of the passenger compartment, or to the cooling fluid of the engine, etc.

The heat transfer fluid circulates in a loop in the heat recovery circuit.

Alternatively, the first port 31 may be fluidically connected to the heat transfer fluid inlet 9. In this case, the inlet conduit 35 is connected to the second orifice 33, while the outlet conduit 37 is fluidically connected to the heat transfer fluid outlet 11.

The valve 15 comprises a bearing 39 to guide the driving shaft 23 (FIGS. 3 and 4). Typically, this bearing 39 is rigidly fixed to the outside of the valve body 19.

Advantageously, the guiding bearing 39 is arranged in the fluid box 29. Thus, the guiding bearing 39 is in direct contact with the heat transfer fluid circulating inside the fluid box. The driving shaft 23 engages in the bearing 39. It is not in direct contact with the heat transfer fluid circulating in the fluid box 29. It is cooled by conduction through the bearing 39 (FIG. 3).

The fluid box 29 internally delimits a circulation passage 41 between the first orifice 31 and the second orifice 33 and forms a restriction 43 at the guiding bearing 39 (FIG. 4). Thus, the heat transfer fluid is forced to circulate around the bearing 39. The cross-section of the passage provided for the heat transfer fluid along the circulation passage 41 is less at the restriction 43 than in the rest of the passage 41.

This also contributes to increasing the speed of circulation of the fluid in contact with the guiding bearing 39, and thus to improving the cooling of this bearing.

Because the guiding bearing 39 is kept at a moderate temperature, it may be made of high performance materials.

For example, the guiding bearing 39 comprises a metal support 45 and a metal knit ring 47 impregnated with graphite (FIG. 3).

The support 45 has a cylindrical sidewall 49 closed at one end by a base 51. The ring 47 is placed inside the cylindrical wall 49. The base 51 is sealed in an orifice 52 of the valve body 19. The base 51 has a central hole 53. The driving shaft 23 passes successively through the central hole 53 and inside the ring 47.

The fluid box 29 advantageously comprises a lower half-shell 55 and an upper half-shell 57 sealingly connected to the lower half-shell 55 (FIGS. 3 to 5).

The lower and upper half-shells 55, 57 are, for example, welded to each other in a sealed manner. More specifically, the respective peripheral edges of the lower and upper half-shells 55, 57 are sealed to one another.

Alternatively, the lower and upper half-shells 55, 57 may be removably attached to one another. This allows the fluid box 29 to be opened to replace a part. Preferably, a seal is then interposed between the lower 55 and upper 57 half-shells. The upper half-shell 57 may advantageously be made of a plastic material.

The lower half-shell 55 is typically made of a metallic material.

The lower half-shell 55 has, for example, the shape of a concave cup. The lower half shell 55 is typically made by stamping.

This makes it possible to conveniently produce reliefs such as a rib 59 delimiting the restriction 43 (FIG. 4).

The lower half-shell 55 is rigidly fixed to the guiding bearing 39 and to the heat exchanger 7.

More specifically, the lower half shell 55 has a hole in which the bearing 39 engages with a tight fit, typically less than 0.1 mm radius. The lower half-shell 55 is typically welded to the bearing 39, or, more precisely, to the support 45.

The first orifice 31 is advantageously formed in the lower half-shell 55. It is positioned to coincide with the outlet 11, or the inlet 9, if appropriate. The lower half-shell 55 is sealed to an outer shell of the heat exchanger 7 around the outlet 11 or the inlet 9.

The upper half-shell 57 closes the fluid box 29.

Typically, the second orifice 33 is formed in the lower half-shell 55. Alternatively, the second orifice 33 may be formed in the upper half-shell 57.

According to a first embodiment, the actuator 25 is fixed to the fluid box 29, outside the fluid box 29.

Typically, the actuator 25 is attached only to the fluid box 29.

Figure 6:
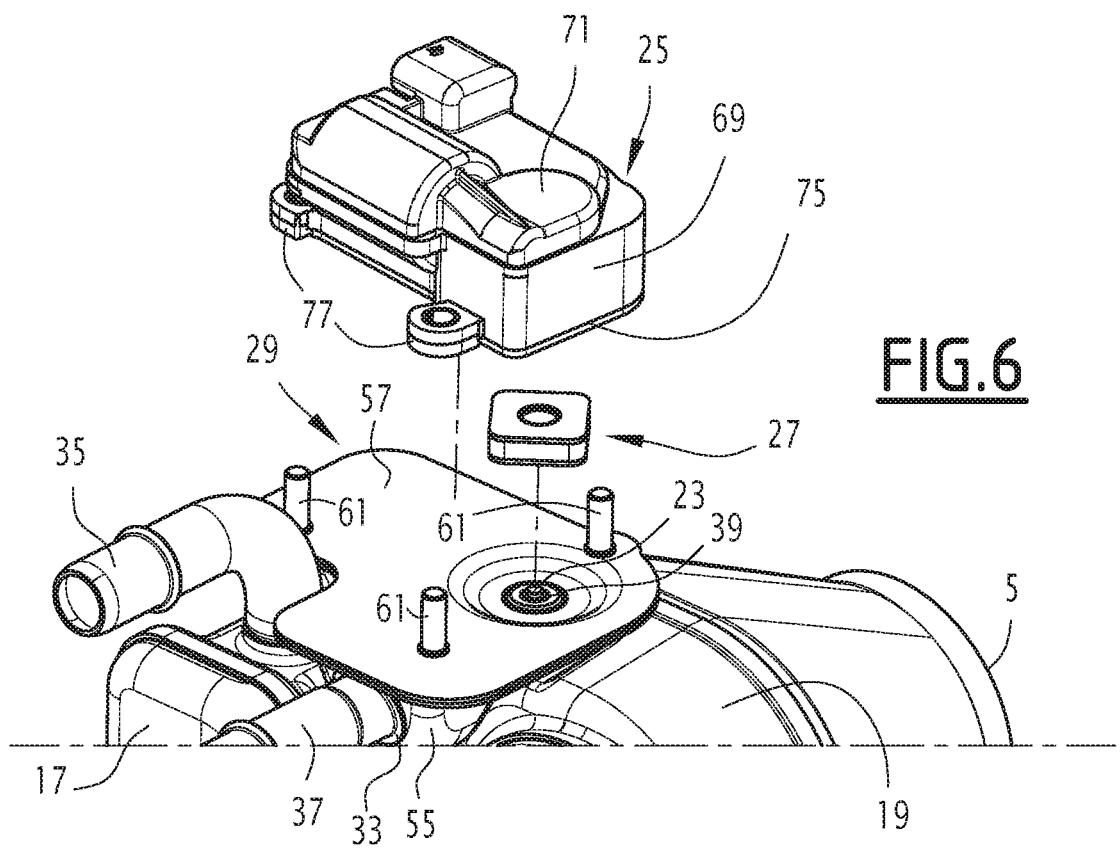
FIG. 6 shows an exploded view of the assembly of FIG. 7.

The actuator 25 is fixed to the upper half-shell 57, for example with fasteners 61 welded to the half-shell 57, as can be seen in FIGS. 2 and 6.

Thus, the actuator 25 is attached to a member cooled by the circulation of the heat transfer fluid. The actuator 25 may be fixed without the interposition of a heat shield, and near the valve body 19. It is not necessary to move the actuator 25 away from the valve body 19 in order to limit heat transfer by conduction along the fasteners.

The upper half-shell 57 has an opening 63 in which an upper end of the guiding bearing 39 engages. The edge of the opening 63 is sealed on the bearing 39.

One end 65 of the driving shaft 23 exits the guiding bearing 39 and protrudes outside the fluid box 29. The end 65 is connected to the actuator 25 by the kinematic chain 27.

The actuator 25 and the kinematic chain 27 are of any suitable type.

For example, the actuator 25 may be an electric motor provided with a rotary output shaft 67 (see FIG. 2). Alternatively, the actuator 25 may be a wax actuator, or a shape memory spring.

The kinematic chain 27 is of any suitable type. In the example shown, the kinematic chain comprises an Oldham seal to transmit a torque from the output shaft 67 to the driving shaft 23 while thermally decoupling the two shafts from each other.

Such a seal is described for example in the patent application WO 2010/103249.

Figure 7:
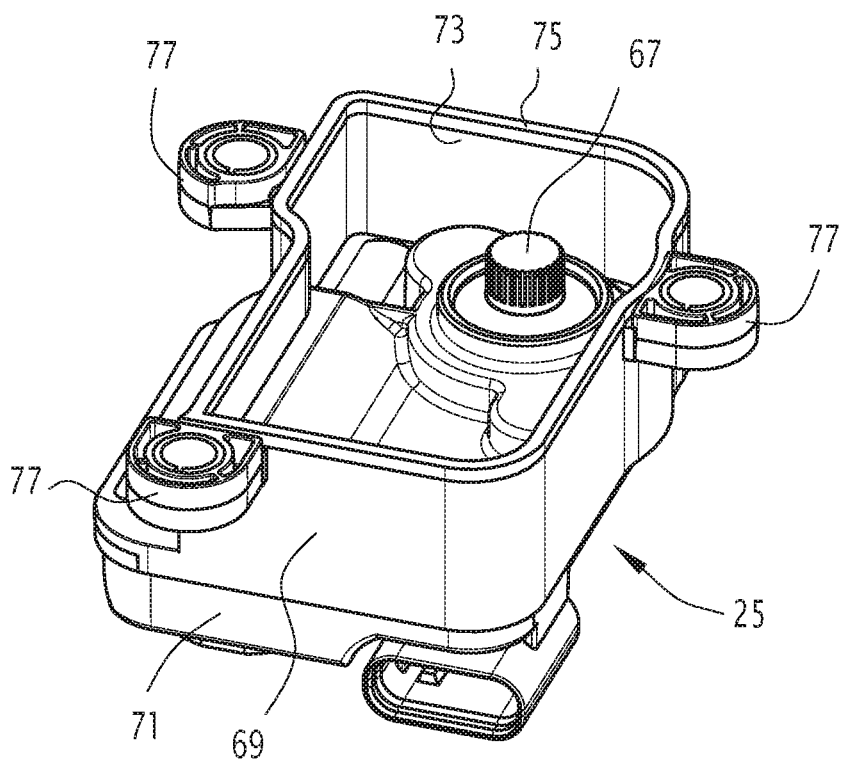
FIG. 7 shows a perspective view of the actuator of FIG. 6, showing the skirt and the seal.

According to an advantageous aspect of the invention, the assembly 1 comprises a skirt 69 sealingly connecting the actuator 25 to the fluid box 29 around the driving shaft 23 (FIGS. 2, 6 and 7). Such a skirt 69 has two functions.

First of all, the skirt 69 protects the kinematic chain 27 and the driving shaft 23 from external aggressions, for example from dust, sand, gravel and all the materials that may be projected upwards during the driving of the vehicle.

The skirt 69 also makes it possible to prevent exhaust gas leakage to the outside. In fact, the exhaust gases possibly rising along the driving shaft 23 between the shaft 23 and the bearing 39, are confined to the space defined by the skirt 69 between the actuator 25 and the fluid box 29.

For example, the actuator 25 may have an outer envelope 71, wherein the skirt 69 is integral with the envelope 71. Typically, it is integral with the envelope 71.

As may be seen in particular in FIGS. 6 and 7, the skirt 69 has a closed-contour free edge 73 bearing a seal 75 that also features a closed contour. The seal 75 is clamped between the free edge 73 and the fluid box 29, more precisely between the free edge 73 and the upper half-shell 57.

Advantageously, the skirt 69 has ears 77 interacting with the fasteners 61 to fix the actuator 25 on the fluid box 29.

The skirt 69 delimits internally a volume in which is housed the kinematic chain 27.

Figure 8:
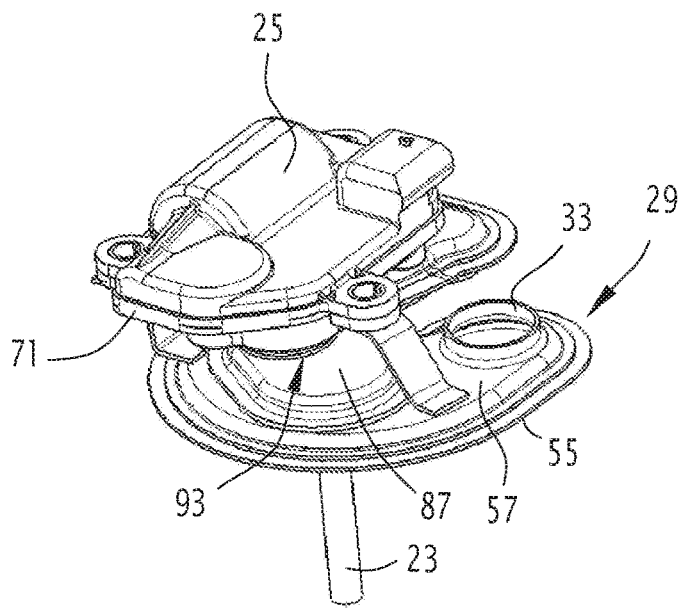
FIG. 8 shows a perspective view of a variant of the first embodiment of the invention.
Figure 9:
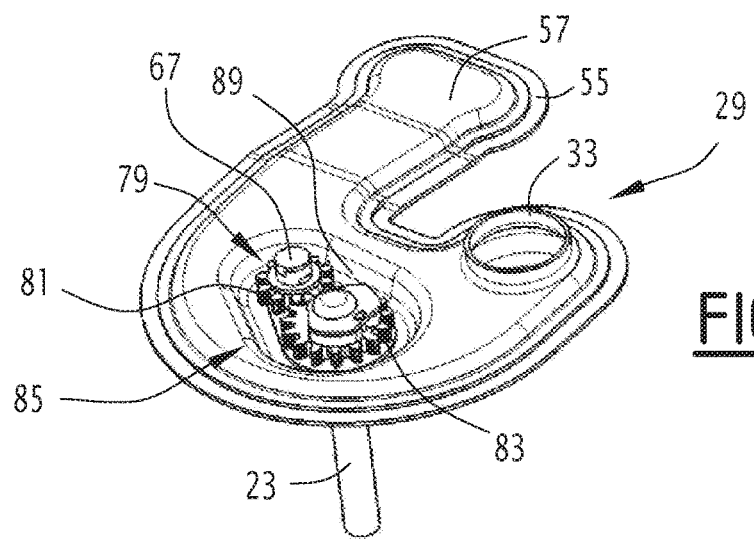
FIGS. 9 and 10 show perspective views of the assembly of FIG. 8, wherein some elements have been removed to reveal the internal components of this assembly.
Figure 10:
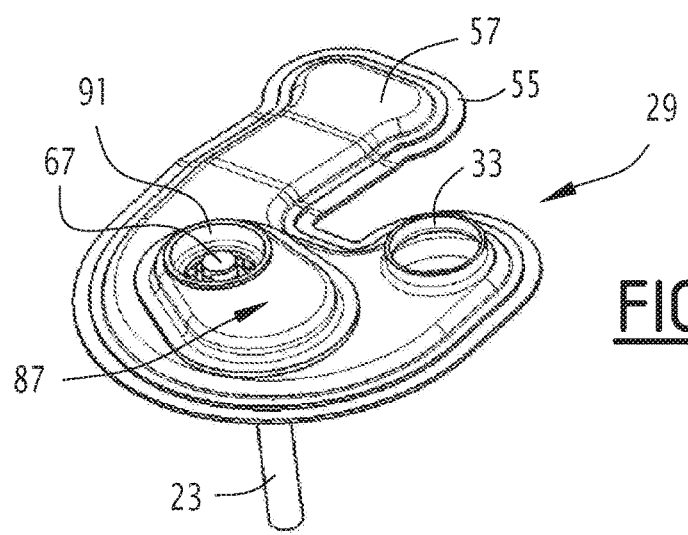

According to an advantageous embodiment variant, the kinematic chain 27 comprises a reducer gear 79 rotatably coupling the output shaft 67 to the driving shaft 23. Such an alternative embodiment is shown in FIGS. 8 to 10.

The reducer gear 79 typically comprises a pinion 81 fixed to the output shaft 67, and a gear wheel 83 fixed to the driving shaft 23. The gear wheel 83 meshes directly with the pinion 81, or alternatively is rotated by the pinion 81 via one or more other gear wheels.

The use of such a reducer gear 79 is made possible because of the low temperature at which the kinematic chain 27 is exposed. At high temperatures, it is not possible to use a reducer gear with pinion and gear wheel without the risk of degradation due to the temperature.

Advantageously, the reducer gear 79 is arranged in a cavity 85 delimited between the fluid box 29 and a cover 87 that is sealingly attached to the fluid box 29.

For example, the upper half-shell 57 has a recessed area 89 in which the reducer gear 79 is placed. The cover 87 is a stamped concave part that closes the recessed area 89. In this case, the upper half-shell 57 as well as the cover 87 are of metal. The cover 87 is then sealed via its peripheral edge on the upper half-shell 57.

The cover 87 advantageously has an opening 91 through which the reducer gear 79 is connected to the output shaft 67 of the actuator 25 (FIG. 10). The actuator 25 is sealed to the cover 87 around the opening 91 (FIGS. 8 and 10). Typically, the outer casing 71 of the actuator 25 comprises a closed-contour seal surrounding the output shaft 67. The seal 93 is clamped between the outer casing 71 and the cover 87, and is positioned around the opening 91.

It should be noted that, in this case, the cover 87 plays the same role as the skirt 69. It protects the kinematic chain 27 from external aggression, and prevents the leakage of exhaust gases to the outside of the assembly 1.

The operation of the assembly 1 will now be described.

The actuator 25 rotates the driving shaft 23 via the kinematic chain 27. This enables the flap 21 to be moved relative to the valve body 19 to adjust the amounts of exhaust gases flowing through the heat exchanger 7 and through the bypass conduit 13.

The heat transfer fluid circulates continuously inside the heat exchanger 7. Before entering the heat exchanger 7, or after leaving the heat exchanger 7, it passes through the fluid box 29. The shape of the circulation passage 41 forces the heat transfer fluid to circulate around the guiding bearing 39.

The exhaust gases circulating in the assembly 1 give up part of their heat energy to the driving shaft 23. This heat energy rises by conduction along the driving shaft 23 and through the guiding bearing 39. It is evacuated by the heat transfer fluid circulating inside the fluid box 29.

Since the valve 15 is of the door type, the flap 21 disappears and is not in full flow in the bypass position. Nor is the driving shaft 23 in full flow. Moreover, the mass of the driving shaft 23 is very limited, for example to the order of 7 grams.

These various elements contribute to limiting the amount of heat transferred by the exhaust gases to the driving shaft 23.

In addition, the exchange density between the gas and the flap 21 or the driving shaft 23 is significantly lower than the exchange density between the heat transfer fluid and the bearing 39. The exchange density for the heat transfer fluid is 2000 W/M.° K compared with 400 W/m2.° K for the exhaust gases.

Furthermore, the thermal conductivity of the material constituting the guiding bearing is much greater than the thermal conductivity of the driving shaft (40 W/m2.° K versus 20 W/m2.° K).

These various factors contribute to limiting the temperature of the driving shaft 23, which may be maintained below 300° C., and typically to the order of 200° C.

A second embodiment of the invention will now be described. Only the points by which this second embodiment differs from the first embodiment will be detailed below. Identical elements or the same function will be designated by the same references.

In the second embodiment, the actuator 25 is placed inside the fluid box 29.

The guiding bearing 39 and the kinematic chain 27 are also positioned inside the fluid box 29.

The actuator 25 is of any suitable type.

Figure 11:
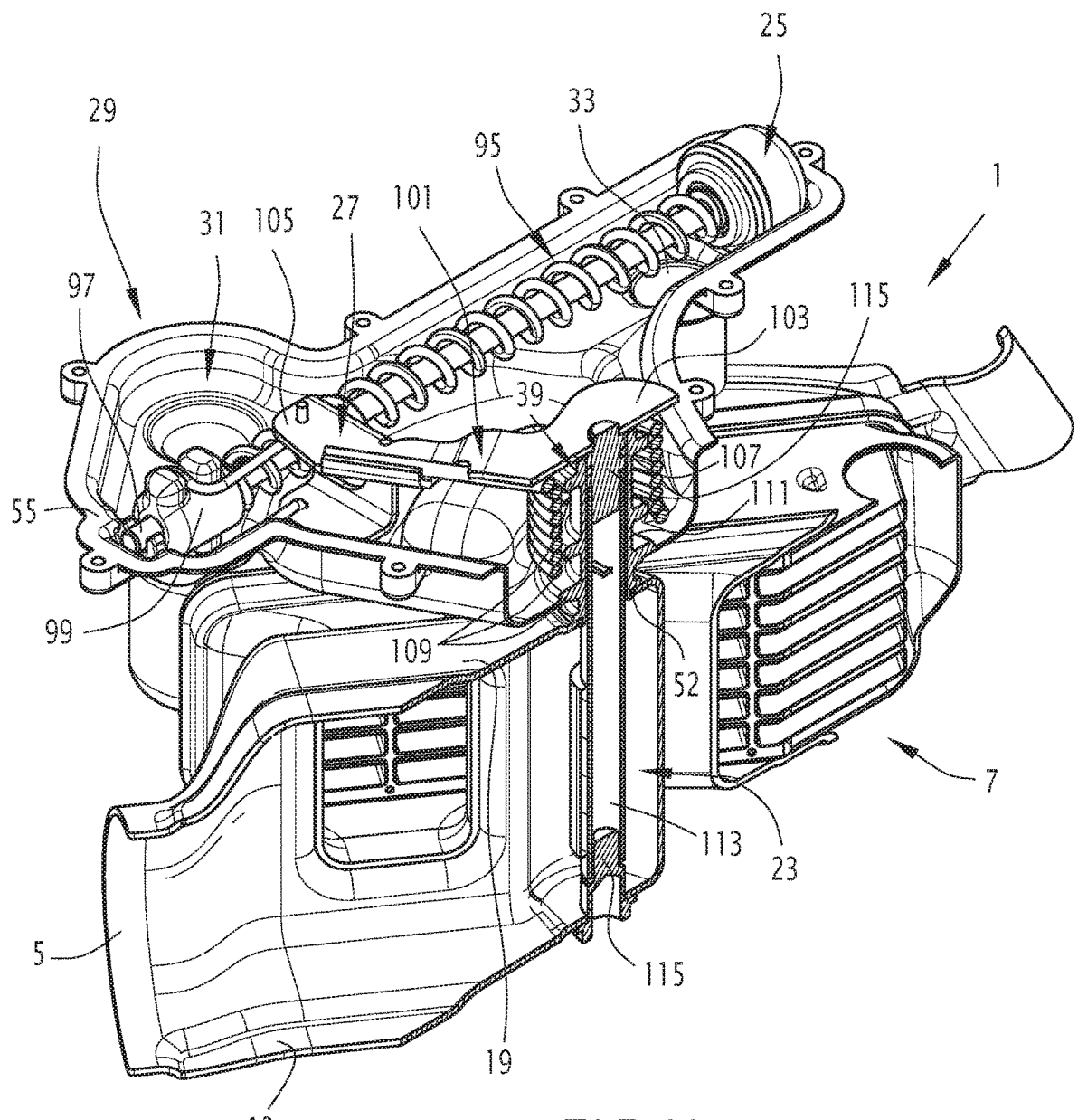
FIGS. 11 and 12 show perspective views of two variants of a second embodiment of the invention, wherein the upper half-shell of the fluid box is not shown in order to reveal the components housed inside the fluid box.

According to an alternative embodiment, the actuator 25 may comprise a shape memory spring 95 (FIG. 11).

Such a shape memory spring is described for example in the patent application FR 1660130.

Typically, such an actuator comprises a rod 97 on which is threaded a ring 99 that is free to slide along the rod 97. The shape memory spring 95 is a helical spring, which has a first end attached to the rod 97 and a second end attached to the ring 99.

Under a predetermined temperature, the shape memory spring 95 is rigid. Beyond the predetermined temperature, the shape memory spring 95 becomes elastic, wherein its length varies as a function of the temperature.

The kinematic chain 27 comprises a lever 103 having a first end 105 rigidly fixed to the transmission shaft 23, and a second end 105 connected to the ring 99 via a pivoting connection. The displacement of the ring 99 along the rod 97 under the effect of temperature variations causes the lever 103 to rotate relative to the valve body 19.

Advantageously, a seal 107 is interposed between the driving shaft 23 and the guiding bearing 39. This seal 107 separates the exhaust gases from the heat transfer fluid. In particular, it makes it possible to prevent the exhaust gases from rising along the driving shaft 23 and penetrating inside the fluid box 29.

The seal 107 is a closed contour seal, for example an O-ring. It is of an elastic material such as rubber, EPDM, silicone, or any other suitable material.

In order to ensure that the temperature of the seal 107 remains below its maximum operating temperature, the guiding bearing 39 has fins 109 in contact with the heat transfer fluid.

The bearing 39 preferably comprises a cylindrical central portion 111, a lower end of which engages in the orifice 52 of the valve body 19. This end is sealed to the valve body 19. The driving shaft 23 is engaged inside the cylindrical central portion 111.

The seal 107 is placed in a groove formed at the periphery of the driving shaft 23, and bears against a radially internal surface of the central cylindrical portion 111. The fins 109 are formed on the radially outer surface of the central cylindrical portion 111.

The height of the bearing 39, the dimensions of the fins 109, and the number of fins 109, are chosen as a function of the amount of heat transferred by the exhaust gases to the driving shaft 23, wherein this amount is to be transferred to the heat transfer fluid.

Moreover, in order to reduce the amount of heat transferred by conduction, the driving shaft 23 is hollow. It comprises a cylindrical hollow central portion 113 that is closed at its two opposite ends by solid parts 115. The groove receiving the seal 107 is hollowed in one of the end portions 115.

In FIG. 11, the bypass conduit 13 and the heat exchanger 7 have different shapes from those of the conduit 13 and the heat exchanger 7 of FIGS. 2 to 10. Alternatively, they may have the same shapes.

Figure 12:
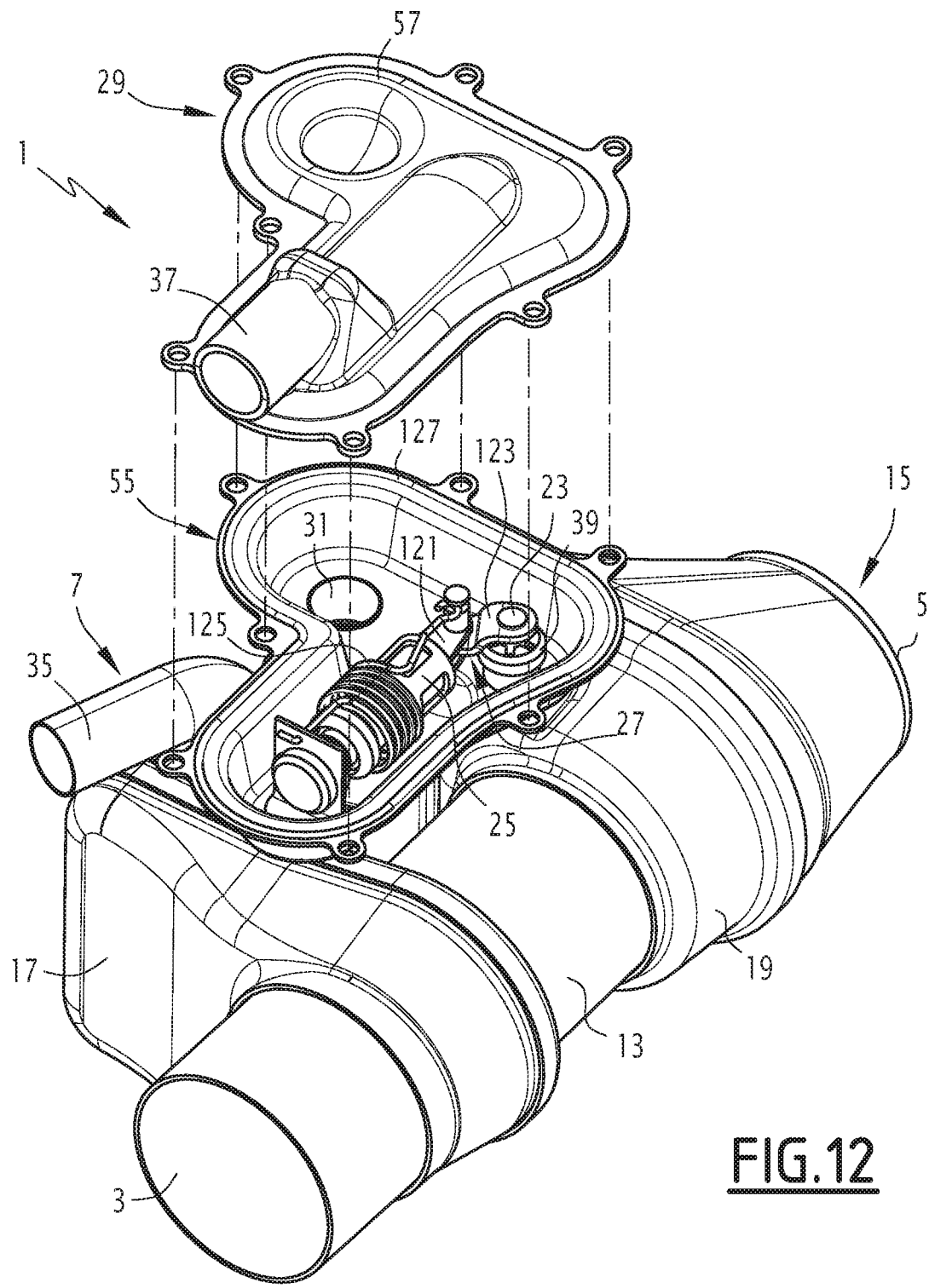

According to a variant of the second embodiment, the actuator 25 is a wax actuator (FIG. 12).

Such an actuator is known and will not be described here in detail.

This actuator 25 comprises a wax cartridge (not shown). The volume of the wax changes according to the temperature. The actuator 25 also comprises a lever 121 that moves longitudinally under the effect of variations in the volume of the wax. The lever 121 is connected via a link 123 to the end of the driving shaft 23.

A return spring 125 returns the lever 121 towards a rest position in a longitudinal direction.

The driving shaft 23 and the guiding bearing 39 are as described above with reference to FIG. 11.

In this embodiment, the lower and upper half-shells 55, 57 are advantageously fixed to each other in a removable manner in order to allow replacement or maintenance of the actuator 25.

They are, for example, fixed to each other by bolts, with the interposition of a seal 127.

The upper half-shell is preferably made of a plastic material.

Figure 13:
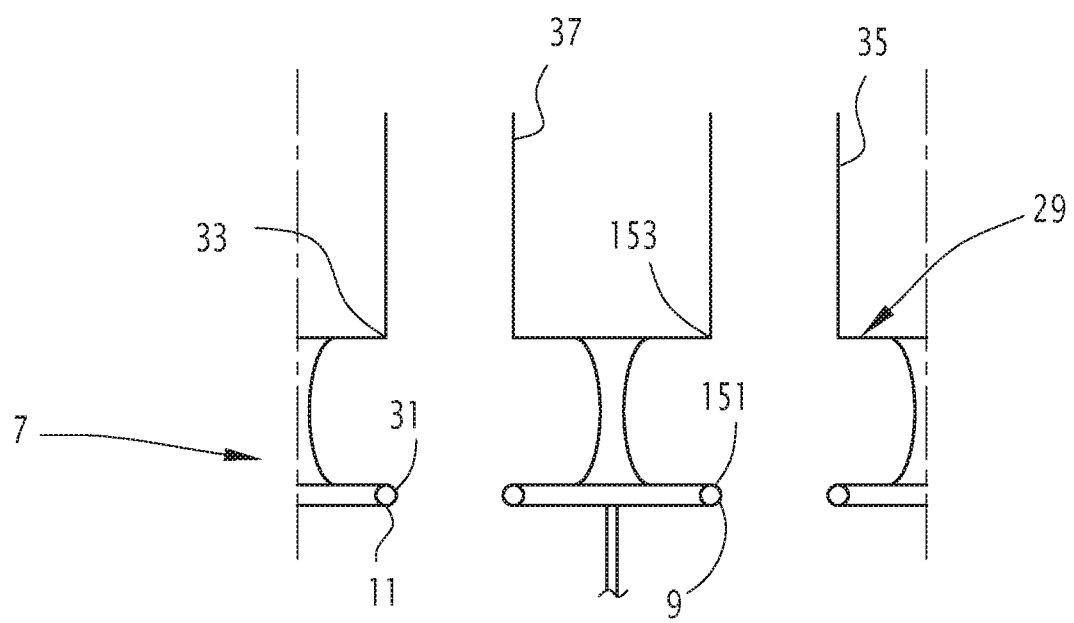
FIG. 13 shows a simplified schematic representation of an alternative embodiment of the invention.

According to an alternative embodiment shown schematically in FIG. 13, the fluid box 29 comprises third and fourth orifices 151, 153. If the first orifice 31 communicates with the heat transfer fluid outlet 11, then the third orifice 151 is in fluidic communication with the heat transfer fluid inlet 9.

The fourth orifice 153 communicates fluidically with the third orifice 151 through the fluid box 29. The fourth orifice 153 is then connected to the heat recovery circuit through the inlet conduit 35.

Conversely, if the first orifice 31 communicates with the heat transfer fluid inlet 9, then the third orifice 151 communicates with the heat transfer fluid outlet 11. The fourth orifice 153 is connected to the heat recovery circuit via the outlet conduit 37.

The fluid box 29 is thus arranged to internally delimit two circulation passages, i.e. a circulation passage between the first and second orifices 31, 33, and another circulation passage between the third and fourth orifices 151, 153.

This embodiment is particularly advantageous when the heat exchanger 7 is of small size. In this case, the fluid box 29 will substantially cover the entire surface of the heat exchanger 7. The inlet 35 and outlet 37 conduits are not welded directly to the heat exchanger 7 but to the fluid box 29, which is much more accessible.

It should be noted that the driving shaft 23 may not be cooled by the heat transfer fluid through the guiding bearing, but is directly in contact with the heat transfer fluid.

The invention offers many advantages.

It completely protects the kinematic chain 27 and the driving shaft 23 against external aggressions. It also makes the valve gas tight, and prevents escape of exhaust gases to the outside, thus preventing oxygen from entering the exhaust channel, which could be detrimental to the operation of certain pollution control devices.

The invention makes it possible to protect the guiding bearing 39 from heat, and thus to use lower cost materials or more efficient materials for the constitution of this guiding bearing.

It also protects the kinematic chain 27 from heat.

The invention also makes it possible to construct all the chains from the position of the guiding bearing and the driving shaft. This avoids having complex constructions while respecting the side chains.

The invention also makes it possible to simplify the welding of the inlet and/or outlet conduits to the exchanger, since the outlet tube and/or the inlet tube are at a distance at the fluid box.

The invention makes it possible to protect the electronic components and the motor from heat, in the case where the actuator is an electric motor.

The overall size of the assembly is reduced.

The invention claimed is:

1. An assembly for an exhaust line, the assembly having at least one exhaust gas inlet and one exhaust gas outlet, the assembly comprising:
   a heat exchanger having an exhaust gas circulation side having an exchanger inlet fluidly connected to the exhaust gas inlet and an exchanger outlet fluidly connected to the exhaust gas outlet, the heat exchanger further having a heat transfer fluid circulation side having a heat transfer fluid inlet and a heat transfer fluid outlet;
   a bypass conduit defining a path for passage for the exhaust gases from the exhaust gas inlet to the exhaust gas outlet and bypassing the heat exchanger;
   a valve adjusting amounts of exhaust gases circulating through the heat exchanger and through the bypass conduit respectively, the valve having a valve body traversed internally by the exhaust gases, a flap arranged inside the valve body and movable relative to the valve body, and a driving shaft that drives the flap; and a fluid box that is fluid communication with the heat transfer fluid circulation side and arranged around the driving shaft to cool the driving shaft, wherein the fluid box comprises a lower half-shell and an upper half-shell attached sealingly on the lower half-shell.

2. The assembly according to claim 1, wherein the fluid box has at least first and second orifices, the first orifice being fluidically connected to one of the heat transfer fluid inlet or the heat transfer fluid outlet, the second orifice configured to connect to a heat recovery circuit.

3. The assembly according to claim 1, wherein the valve comprises at least one guiding bearing for the driving shaft arranged in the fluid box.

4. The assembly according to claim 3, wherein the fluid box has at least first and second orifices, the first orifice being fluidically connected to one of the heat transfer fluid inlet or the heat transfer fluid outlet, the second orifice configured to connect to a heat recovery circuit and wherein the fluid box internally delimits a circulation passage between the first orifice and the second orifice to form a restriction at the guiding bearings.

5. The assembly according to claim 1 wherein the valve comprises at least one guiding bearing for the driving shaft arranged in the fluid box, and wherein the lower half-shell is rigidly fixed to the guiding bearing and to the heat exchanger.

6. The assembly according to claim 1, including an actuator and a kinematic chain through which the actuator drives the driving shaft of the flap, the actuator being attached to the fluid box outside the fluid box.

7. The assembly according to claim 6, wherein the driving shaft protrudes from the fluid box, and including a skirt around the driving shaft to sealingly connect the actuator to the fluid box.

8. The assembly according to claim 6, wherein the actuator is an electric motor comprising an output shaft, the kinematic chain comprising a reducer gear that rotationally couples the output shaft and the driving shaft.

9. The assembly according to claim 8, wherein the reducer gear is arranged in a cavity defined between the fluid box and a cover sealingly attached to the fluid box.

10. The assembly according to claim 9, wherein the cover has an opening through which the reducer gear is connected to the output shaft, the actuator being sealingly attached to the cover around the opening.

11. An assembly for an exhaust line, the assembly having at least one exhaust gas inlet and one exhaust gas outlet, the assembly comprising:

a heat exchanger having an exhaust gas circulation side having an exchanger inlet fluidly connected to the exhaust gas inlet and an exchanger outlet fluidly connected to the exhaust gas outlet, the heat exchanger further having a heat transfer fluid circulation side having a heat transfer fluid inlet and a heat transfer fluid outlet;

a bypass conduit defining a path for passage for the exhaust gases from the exhaust gas inlet to the exhaust gas outlet and bypassing the heat exchanger;

a valve adjusting amounts of exhaust gases circulating through the heat exchanger and through the bypass conduit respectively, the valve having a valve body traversed internally by the exhaust gases, a flap arranged inside the valve body and movable relative to the valve body, and a driving shaft that drives the flap;

a fluid box that is fluid communication with the heat transfer fluid circulation side and arranged around the driving shaft to cool the driving shaft; and an actuator and a kinematic chain through which the actuator drives the driving shaft of the flap, the actuator being placed inside the fluid box.

12. The assembly according to claim 11 wherein the valve comprises at least one guiding bearing for the driving shaft arranged in the fluid box, and wherein a seal is interposed between the driving shaft and the guiding bearing.

13. The assembly according to claim 12, wherein the guiding bearing has fins in contact with heat transfer fluid.

14. The assembly according to claim 11, wherein the driving shaft is hollow.

15. An assembly for an exhaust line, the assembly having at least one exhaust gas inlet and one exhaust gas outlet, the assembly comprising:

a heat exchanger having an exhaust gas circulation side having an exchanger inlet fluidly connected to the exhaust gas inlet and an exchanger outlet fluidly connected to the exhaust gas outlet, the heat exchanger further having a heat transfer fluid circulation side having a heat transfer fluid inlet and a heat transfer fluid outlet;

a bypass conduit defining a path for passage for the exhaust gases from the exhaust gas inlet to the exhaust gas outlet and bypassing the heat exchanger;

a valve adjusting amounts of exhaust gases circulating through the heat exchanger and through the bypass conduit respectively, the valve having a valve body traversed internally by the exhaust gases, a flap arranged inside the valve body and movable relative to the valve body, and a driving shaft that drives the flap;

a fluid box that is fluid communication with the heat transfer fluid circulation side and arranged around the driving shaft to cool the driving shaft;

wherein the fluid box has at least first and second orifices, the first orifice being fluidically connected to one of the heat transfer fluid inlet or the heat transfer fluid outlet, the second orifice configured to connect to a heat recovery circuit; and wherein the fluid box has a third orifice communicating with the other of the heat transfer fluid inlet or the heat transfer fluid outlet, and has a fourth orifice fluidically communicating with the third orifice through the fluid box, the fourth orifice configured to connect to the heat recovery circuit.

* * * * *